June 2, 1936.   W. T. CONN   2,042,457

STRETCH AND COMPRESSION TESTING DEVICE

Filed Dec. 1, 1932

Inventor:
Wallace T. Conn
By J. F. Mothershead
Attorney

Patented June 2, 1936

2,042,457

UNITED STATES PATENT OFFICE 2,042,457

STRETCH AND COMPRESSION TESTING DEVICE

Wallace T. Conn, Lawrence, Mass., assignor to Government of the United States, represented by Secretary of Commerce Application December 1, 1932, Serial No. 645,282

4 Claims. (Cl. 265—17)

(Granted under the act of March 3, 1883, as amended April 30, 1928; 370 O. G. 757)

The invention described herein may be manufactured and used by or for the Government of the United States for governmental purposes without the payment to me of any royalty thereon.

My invention relates to a device for determining the intensity of stress, applied to an object, up to and beyond the elastic limit, or yield point, to the ultimate stress point of the same. The use of these terms are intended to mean as defined on page 114 of "The Engineer's Manual" by Hudson, published by John Wiley & Sons, Inc., New York, 1917.

The object of my invention is to provide a measuring device for readily and efficiently measuring compression and tensile strength of materials and particularly for measuring non-rigid materials under a predetermined tension.

For the purpose of a clear understanding of my invention I will describe the same in its use in connection with measuring the stretching ability and length of webbing or mesh of fish nets. It is to be understood, however, that my device is not to be limited to such use only. From the foregoing objects and the detailed description it will be obvious that my device may be used for measuring the elasticity of an object, the intensity of stress applied to an object up to and beyond the elastic limit or yield point, and the ultimate stress point, or for measuring an object's resistance to stretch or compression.

The accurate measurement of the mesh or webbing of fish nets and similar non-rigid textiles has been difficult due to the physical character, the weight and superficial size. For certain control operations, gauges are used but do not serve as actual and accurate measuring devices. Likewise, inaccuracy has been experienced in springless dead weight measuring instruments due to the non-rigid character of textiles to be measured and, too, measuring instruments having a spring element are inaccurate due to the weakening and stretching of the spring. Furthermore, these devices are seriously affected by vibration and their use is limited to ideal conditions seldom found in commercial practice and generally prohibitive in factories and particularly on boats where it is frequently necessary to measure fish nets.

Among the most common causes of inaccuracy of known instruments are the absence of means for determining the proper tension to be placed upon material, the absence of means for determining the proper rate of speed leading up to a predetermined tension, the absence of means for determining when the reading should be taken and the consequential continual changing in the readings due to continual stretching.

My invention comprises a springless measuring device, relatively light, simple, portable, not seriously affected by vibration, since the controlling weight is not in service except at the moment when a predetermined tension or stress is applied to the material, and can be used in a horizontal plane or vertically. The present invention will be seen to be commercially convenient, efficient, and accurate.

Other objects will become apparent as the description of my invention is developed with reference to the accompanying illustrative drawing, in which—

Figure 3:
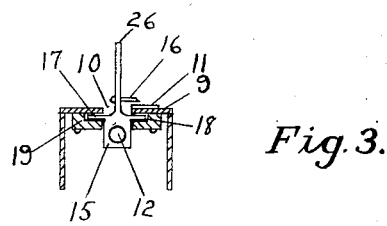
Figure 3 is a cross section showing particularly the mounting of the traveler nut.

Referring particularly to character references of the drawing illustrating an embodiment of my invention, I provide a body portion comprising a beam or mounting plate 9 having a slot 10 along one side of which a gauge 11 is provided. A worm shaft 12 is mounted parallel with the beam or mounting plate by means of a bearing 13 and operated by means of a thumb screw 14. A nut traveler 15, having a portion thereof extending up through the slot, is mounted on the shaft 12. On the portion of the nut traveler extending up through the slot is provided an indicator 16 cooperating with and reading on the gauge 11. The nut traveler 15 is also provided (Figure 3) with arms 17 adapted to slide in grooves 18. These arms act as supporting means for the nut traveler and shaft and at the same time prevents any rotary movement of the nut. These grooves are formed by stepped strips 19 attached to the under surface of the beam or plate 9.

A T shaped weight element 20 is pivotally mounted on posts 24 on the member 9 at the end opposite from that of the thumb screw. This weight element comprises an arm 21 having weight 22, an arm 25 for engaging the material 27 to be measured, and an arm 28 extending down through the member 9 for making and breaking a circuit when engaging and disengaging the contact point 29 of a battery 30. Additional sleeve weights may be attached to the weight 22 by any desired means such as a screw 23. Cooperating with the arm 25, for engaging the material, is an arm 26 on the portion of the nut traveler 15 extending up through the slot 10. The battery 30 is carried by the member 9 by means of a clamp 31 and is connected to a bulb 32, mounted on post 34, by means of wire 33. The bulb is so positioned as to throw a beam of light up through the slot 10 when the circuit is closed, and operates as a means for readily indicating a predetermined movement of the weight element which is brought about by a proper tension on the material to be tested. Means are provided for determining the rate of tension or compression, i. e., the rate of speed with which the material is brought up to a definite tension or compression, which comprises a milled or serrated wheel or shoulder 35 on the shaft adjacent to the thumb screw, and cooperating therewith is a resilient dog 36 mounted on the beam 9 on post 37.

A stop 38 may be provided in order that the initial pull on engaging arm 25 is from a point of maximum leverage. When the device is used, as hereinafter described, for determining compressional ability of objects, this stop 38 prevents movement of the engaging arm 25 (which may, if desired for this purpose, be substituted by a compression plate) beyond a position parallel to the face of the engaging arm 26 (which may also, if desired, be replaced by a compression plate) on the traveler nut 15.

It is obvious from the foregoing description that the replacement of the engaging arms 25 and 26 by pressure plates adapts the instrument for use in measuring the compressional ability of objects, the method of operation being the reverse adjustment of the thumb screw to provide shortening of the space between the engaging arms or plates instead of lengthening the space between the engaging arms or plates 25 and 26.

Figure 5:
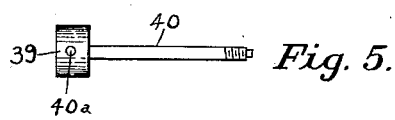
Figure 5 is a weighted arm for attachment to the device as shown in Figures 1, 2 and 4 when it is desired to use the same in a vertical position.

When the device is used in a vertical position for tension measurement with the thumb screw 14 up, the weighted arm 40 shown in Figure 5 is attached to the pivoted weight element by means of a socket 38a in the head of the stop 38. When the device is used for tensional measurement with the thumb screw 14 down the weighted arm 40 may be attached by means of a socket 22a in the weight 22, to extend in the opposite parallel direction from that just described. Dependent upon which end of the instrument is up when used in a vertical position, the weighted arm 40 should be attached in the plane of rotation, whereby the action of gravity on the bob 39 of the weighted arm 40 places the material 27 under tension; tends to rest on the stop 38; and tends to lengthen the space between the engaging arms. Preferably the bob 39 of the weighted arm 40 is located a distance from the axis of the weight element by positioning the weighted arm at right angles to the arm 21.

Figure 1:
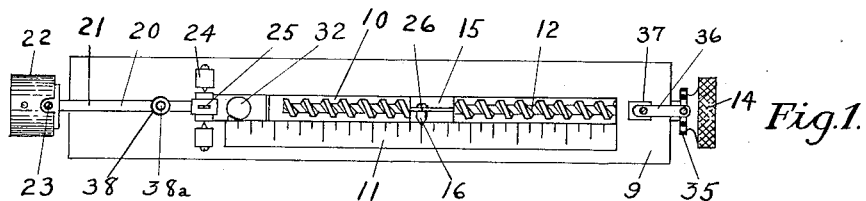
Figure 1 is a top plan view of an embodiment of the present invention.
Figure 2:
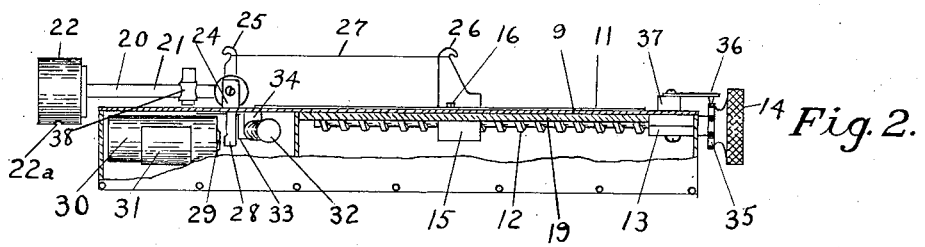
Figure 2 is a view in elevation partly in section and broken away to show the interior assembly of parts.
Figure 4:
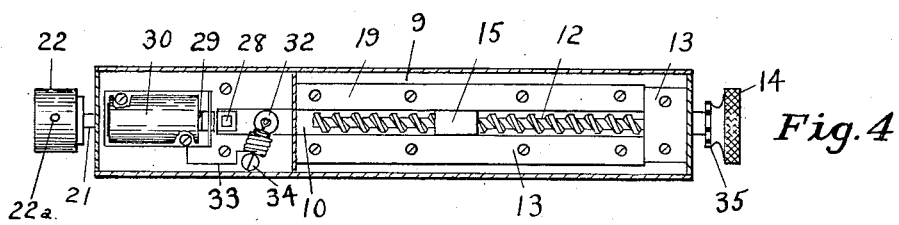
Figure 4 is a view of the instrument in bottom plan view.

When the instrument is used in a vertical position, with thumb screw 14 at the top, for compressional measurements, it will be obvious that by screwing the weighted arm 40 (Fig. 5) into socket 22a (Fig. 4) the tendency of the weighted arm 40 is to move the engaging arm, or plate, 25 into compressional relation with the engaging arm, or plate, 26. Or, if the instrument is used in a vertical position, with the thumb screw 14 at the bottom, a similar compressional relation is attained by screwing arm 40 (Fig. 5) into socket 38a (Fig. 1). Assuming the instrument is used in vertical positions, as aforesaid, the reversal of the position of the weighted arm 40, from the positions as used for measuring tension, is obviously not necessary if the instrument itself is reversed, i. e., the reversal of the instrument itself automatically reverses the effect, from tension to compression, of the weighted arm. When the instrument is to be used for compressional measurement in a horizontal plane, although not shown in the accompanying drawing but obvious to those skilled in the art, the weighted arm 40 should be attached to the socket 38a and the weight 22 removed from its position as shown in the drawing and attached to socket 40a to extend from a point over the pivot toward the thumb screw 14.

When the instrument is used for compressional measurement the extinguishing of the light indicates a predetermined movement of the weight element brought about by the proper pressure on the material to be tested in the same manner that the lighting of the bulb indicates a predetermined movement of the weight, brought about by the proper tension, when the device is used for tension measurement.

The object of the light is to immediately indicate the proper tension or compression brought about by a predetermined movement of the weight element and thereby eliminates the necessity for constant scrutiny of the weight element in order to determine minute movements thereof. However, if desired, the light may be eliminated and any means for indicating the movement of the weight element, brought about by pull or compression on the material, may be employed.

In the operation of the device, the material to be measured is suspended from engaging arm 25 to engaging arm 26 and the shaft 12 rotated by means of thumb screw 14 whereby the nut traveler 15, carrying engaging arm 26, places the material 27 either under tension or compression, dependent upon the desired measurement and position of the weights. The nut traveler 15 is moved until the tension or compression on the suspended material 27, determined by the weight, is sufficient to lift the weight, against gravity, to a predetermined point. The predetermined point being indicated by the lighting or extinguishing of the bulb 32, caused by the arm 28 closing or breaking the circuit. The proper tension or compression being once determined, the reading as indicated on the gauge 11 by the indicator 16 can be taken at any time regardless of whether the material thereafter continues to stretch or compress. In the operation, the definite rate of pull or push speed leading up to a definite tension or compression is a controlling factor inasmuch as a slow rate of pull or push will permit the material to stretch or compress more before reaching a definite tension or compression than if the rate of tension or compression were rapid. This rate pull or push speed can be determined micrometrically by the serrated shoulder 35, the dog 36 cooperating therewith and the nut traveler indicator 16 cooperating with the gauge 11 and too, the number of clicks of the dog 36 from one serration to another or rotations of the thumb screw 14 or points of movement on the gauge 11 per second, or other period of time, may indicate the rate of compression of tension.

It will be understood that the foregoing description and accompanying drawing comprehend only the general and preferred embodiment and uses of my invention and that minor detail changes in the construction and arragement of parts and uses may be made within the scope of the appended claims without sacrificing any of the advantages of my invention.

Having thus described my invention, what I claim is:

1. A springless device for measuring the distortion of an object under a predetermined intensity of stress comprising the combination of a scale, a worm shaft parallel with said scale, a nut traveler mounted on said shaft and cooperating with said scale, means carried by said worm nut for engaging the material to be measured, an L lever pivoted at its angle, one arm thereof carrying a weight and another carrying material engaging means, an electrical signal, a make-and-break contact device for operating said signal actuated by said lever, and means to indicate movement of the nut traveler.

2. In a measuring device, the combination of a supporting member, a plurality of material-engaging elements mounted thereon, one of said engaging elements being pivotally mounted on the supporting member to serve as a make and break contact device, another of said engaging elements being slidably mounted relative to the pivotally mounted engaging element, means to move said slidable element, means to indicate movement of said sliding element, a scale cooperating with said slidable element to measure the movement thereof, and an electrical signaling device operated by the pivotally mounted engaging element, serving as a make and break contact device, to indicate a predetermined force applied to the material under test.

3. In a measuring device, the combination of a supporting member, a plurality of material-engaging elements mounted thereon, one of said engaging elements being pivotally mounted on the supporting member, an electrical signal to electrically indicate movement of the pivoted element to a predetermined position, a make and break contact device for operating the electrical signal actuated by said pivoted element, another of said engaging elements being slidably mounted relative to the pivotally mounted engaging element, means to move said slidable element, means to indicate movement of the sliding element, and a scale cooperating with said slidable element to measure the elasticity of said material under a predetermined force.

4. A springless device for measuring the distortion of an object under a predetermined intensity of stress comprising the combination of a lever arm adapted to engage the material to be tested, means tending to hold the arm in one position, means to exert a force upon the material tending to move the arm in the opposite direction, electrical indicating means, a make-and-break contact device for operating said electrical indicating means cooperating with said lever arm to readily indicate a predetermined force on said lever arm, and means to automatically retain stopping positions of said force exerting means.

WALLACE T. CONN.